US010091945B2

(12) United States Patent
Garnier et al.

(10) Patent No.: US 10,091,945 B2
(45) Date of Patent: Oct. 9, 2018

(54) DEVICE FOR SPRAYING PRODUCTS FROM A DISTANCE AND AN AGRICULTURAL MACHINE INCLUDING THE SAME

(71) Applicant: Kuhn-Audureau SA, La Copechagniere (FR)

(72) Inventors: Charly Garnier, Saint Philbert de Bouaine (FR); Christophe Roger, La Roche sur Yon (FR)

(73) Assignee: Kuhn-Audureau SA, La Copechagniere (FR)

( * ) Notice: Subject to any disclaimer, the term of this patent is extended or adjusted under 35 U.S.C. 154(b) by 68 days.

(21) Appl. No.: 15/157,509

(22) Filed: May 18, 2016

(65) Prior Publication Data
US 2016/0360706 A1 Dec. 15, 2016

(30) Foreign Application Priority Data

Jun. 10, 2015 (FR) ...................................... 15 55292

(51) Int. Cl.
*A01F 29/00* (2006.01)
*A01F 29/12* (2006.01)
(Continued)

(52) U.S. Cl.
CPC ............ *A01F 29/005* (2013.01); *A01F 29/12* (2013.01); *A01K 5/001* (2013.01); *A01K 5/002* (2013.01); *A01K 5/007* (2013.01); *A01K 29/00* (2013.01)

(58) Field of Classification Search
CPC ........ A01F 29/12; A01F 29/005; A01F 29/02; A01F 29/04; A01K 5/001–5/007; A01K 29/00
(Continued)

(56) References Cited

U.S. PATENT DOCUMENTS 4,078,734 A * 3/1978 Purrer ..................... A01F 29/14
241/222
4,082,198 A * 4/1978 Anderson ............. A01F 29/005
239/651
(Continued)

FOREIGN PATENT DOCUMENTS

DE 37 27 156 A1 2/1989
EP 1 149 527 A2 10/2001
(Continued)

OTHER PUBLICATIONS

French Preliminary Search Report dated Feb. 17, 2016 in French Application 15 55292, filed on Jun. 10, 2015 ( with English Translation of Categories of Cited Documents and Written Opinion).

*Primary Examiner* — Steven J Ganey
*Assistant Examiner* — Cody Lieuwen
(74) *Attorney, Agent, or Firm* — Oblon, McClelland, Maier & Neustadt, L.L.P.

(57) ABSTRACT

A device for spraying bulk or piecemeal products includes a casing with a rotary spraying organ and a lateral ejection opening prolonged by a spout. The rotary organ includes radial vanes designed to form a material jet directed along the axis of the spout, with generation of a carrier air stream. The ejection opening is provided with a bounding rim disposed on that side of the opening which is last to be reached by the outer peripheral ends of the vanes in the course of their rotation during operational functioning of the device. The spraying device also includes an active and mobile organ, designed for directing the products that come into contact with it through the opening, into the spout and substantially into the jet of ejected material. The active and mobile organ is disposed in the region of the rim.

18 Claims, 6 Drawing Sheets

(51) Int. Cl.
*A01K 5/00* (2006.01)
*A01K 29/00* (2006.01)

(58) Field of Classification Search
USPC ........ 239/654, 655, 661, 664, 670, 679–682
See application file for complete search history.

(56) References Cited

U.S. PATENT DOCUMENTS

| | | | | |
|---|---|---|---|---|
| 4,619,410 | A | * | 10/1986 | Lenzer .................... A01F 29/12 241/158 |
| 5,033,683 | A | * | 7/1991 | Taylor ................. A01D 87/127 241/101.2 |
| 2008/0185464 | A1 | * | 8/2008 | Nitta ..................... A01F 29/005 241/21 |
| 2015/0069158 | A1 | * | 3/2015 | Graham ................. A01K 5/005 241/101.5 |
| 2015/0272012 | A1 | | 10/2015 | Roger et al. |

FOREIGN PATENT DOCUMENTS

| | | | | |
|---|---|---|---|---|
| FR | 2 993 138 A1 | | 1/2014 | |
| GB | 2035822 A | * | 6/1980 | ........... A01D 90/105 |
| GB | 2 079 574 | | 1/1982 | |

\* cited by examiner

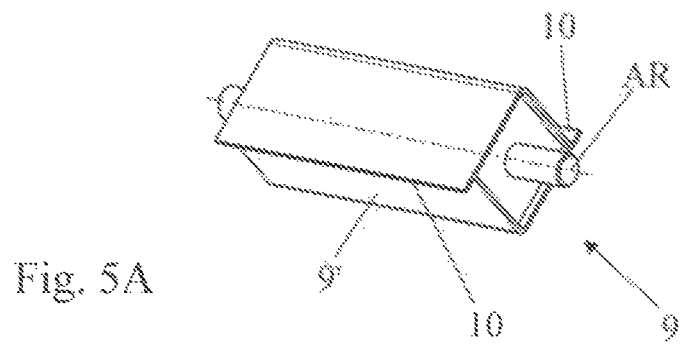
Fig. 5A
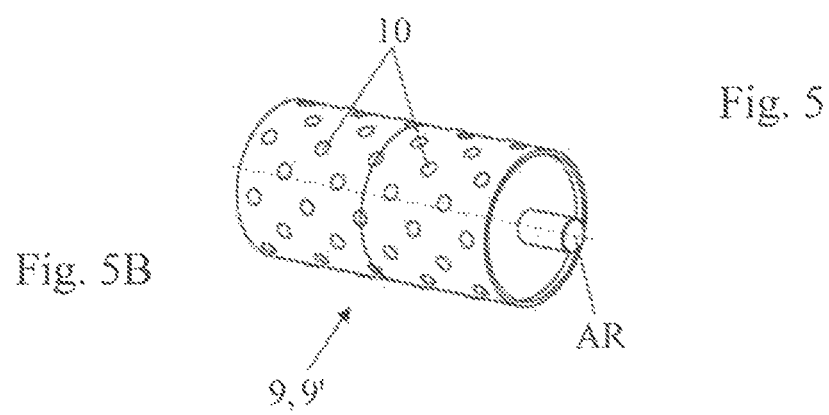
Fig. 5B
Fig. 5
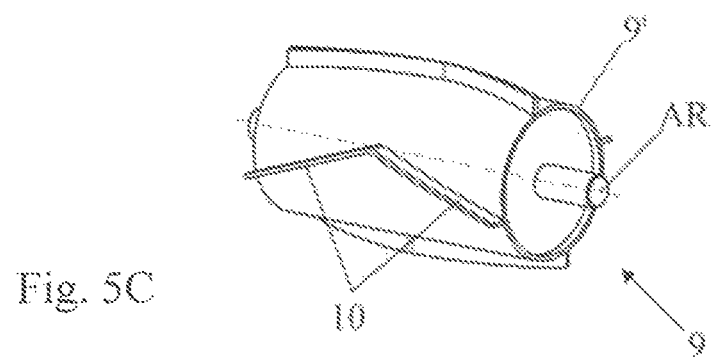
Fig. 5C

DEVICE FOR SPRAYING PRODUCTS FROM A DISTANCE AND AN AGRICULTURAL MACHINE INCLUDING THE SAME

BACKGROUND

The present invention relates to the field of agricultural equipment, more particularly to agricultural machines, more particularly to agricultural machines that execute or integrate a function of spraying products over a distance, and has as its object an improved spraying device and an agricultural machine equipped with such device.

The devices concerned within the scope of the present invention are essentially of the type of device for spraying bulk or piecemeal products, in particular products for animal feed or formation of bedding for animals. Such devices generally comprise a casing in which a rotary spraying organ is mounted that is provided with a lateral ejection opening prolonged by a conduit or a spout, the said rotary organ having radial vanes designed to impel the products in order to eject them through the opening into the spout, by forming a material jet directed substantially along the median axis of the spout portion adjacent to the opening, and advantageously with simultaneous generation of a carrier air stream corresponding to the air stream generated by this rotary organ and sent into the spout. The ejection opening is made in the peripheral wall of the casing, along the internal face of which the outer ends of the radial vanes travel, and it is provided with a rim or bounding edge disposed on that side of the opening which is last to be reached by the outer peripheral ends of the vanes in the course of their rotation during operational functioning of the device, and which generally forms the lower rim or edge of the said opening.

Such devices are present on livestock feeding machines or shredding machines, which are autonomous, towed or mounted, but also on machines for distributing or moving products.

A particular application of this type of device concerns the distribution of products, such as hay or silage, to animals, or else for spraying straw onto their bedding.

Machines performing these functions are in particular sold by the Applicant in the scope of its PRIMOR product line.

These machines are generally provided with a chamber in which the products to be sprayed are loaded (often in partly agglomerated or compacted form, such as bales, bunches, blocks or the like), to be conveyed, for example by a beater drum, into the casing containing the rotary spraying organ (or turbine).

In this way these products arrive on the radial distribution vanes of the rotating turbine, are impelled by them in their rotary movement and are ejected from the casing via the peripheral lateral opening under the effect of centrifugal force (and therefore of the movement imparted thereby) and of the air stream generated by the rotation of the vanes and channeled through the opening and the attached spout. By way of example, the document EP 1149527 describes such a machine.

Typically, the rotary spraying organ (turbine) can have a speed of rotation on the order of 620 rpm when the machine is used to execute a shredding operation, the straw being sprayed for a distance of between 5 and 18 m. In contrast, the machine has a speed of rotation of only 310 rpm when the machine is being used to execute a distribution operation in which the products loaded into the chamber must be deposited at the foot of the machine (examples of the most commonly treated products: hay, corn silage, grass silage, wrapped grass).

On certain machines used to execute the operations of shredding and distribution, a supplementary function of chopping exists. Thus the product in the form of long-stalked vegetation can be chopped and therefore shortened before being ejected.

Usually the straw is a dry product, since it is stored in a shed or the like. The straw introduced into the chamber arrives on the radial distribution vanes of the turbine and is chopped by the cutters and counter-cutters disposed on the circumference. When the straw stalks are sufficiently short and light, they are ejected by the main air stream created by the turbine. The insufficiently chopped stalks are recycled, in other words they fall between the cutters and the recycling plate so as to be passed once again into the casing.

Such a distributing shredder-chopper as described, for example, in FR 2993138) is now functioning effectively with dry products. In contrast, problems arise when the product to be distributed is wet, in particular because the position of the adjustable counter-cutter, at the level of the orifice of the lateral outlet, obstructs and/or diverts the product.

In effect, the heavier product tends to be too low relative to the main stream and it does not have enough velocity to be ejected: it therefore accumulates at the level of the recycling zone.

Furthermore, the product that is ejected but not transported in the main stream is not sprayed sufficiently far away (sometimes to a distance of less than 5 meters) and, for example, may be end up at the level of the feed alley.

This problem is also encountered, on a smaller scale, on the machines used for shredding and distribution without being equipped with the chopping function.

In the case of a machine equipped with the chopping function, the accumulation of the wet product at the level of the recycling zone may be enough to cause blockages.

For example, the wet long-stalked vegetation is taken from a bale of fodder that is wrapped in a tight envelope formed by interlaced tapes of plastic material. This fodder contains approximately 45-50% of dry matter. The distribution of the product originating from a wrapped bale takes place in packets, because the long stalks are entangled. To facilitate the passage of the packets, the cross section of the outlet orifice may be made larger. Despite this larger cross section, however, the risk of blockage related to the accumulation of product on the lower rim or edge of the ejection opening (folded-over portion of the upper end 54 of the recycling plate 52 of the document FR 2993138) remains.

In the region of this lower rim and to some extent in the lower part (one fifth to one third of its height) of the attached passage formed by the spout portion adjacent to the opening, the inventors have identified a neutral zone, of weak flow or of turbulent flow, which is not crossed by the main air stream. In effect, it has been possible to observe that the main stream is concentrated in the upper part of the ejection orifice and of the interior passage of the spout.

In this neutral zone, the speed of the blower is too low to eject the wet stalks, which are heavier, and they therefore fall due to gravity and accumulate on the said rim and entry of the spout. This problem is accentuated in the presence of a counter-cutter in the upper part close to the opening, and especially when this counter-cutter is completely outside in order to achieve intensive chopping.

This problem is also present when it is desired to spray wet straw, stored outside, onto the bedding. The heaviest stalks end up and become accumulated in the neutral zone, in other words at the level of the lower rim and of the entry of the spout. The wetness further accentuates the phenomenon of adherence of the stalks to one another.

From documents EP 1149527 and EP0098769, agricultural machines for distribution of products are further known in which a turbine performing a spraying function and a chopping function is mounted in the ejection spout. The passage into the spout is consequently almost totally obstructed by the turbine, and the quantity of products that can be sprayed as well as the spraying distance is therefore greatly limited by this fact.

BRIEF SUMMARY

The objective of the present invention is to appreciably reduce the risks of accumulation of products in the spraying devices of the type mentioned in the introduction and therefore of blockage of machines equipped therewith, but also to broaden the range of types of products capable of being treated by these devices.

To this end, the object of the invention is a spraying device of the type mentioned in the introduction, characterized in that at least one active and mobile organ, capable of and designed for directing the products that come into contact with it through the opening, into the spout and substantially into the jet of ejected material, is disposed in the region of the said rim or of the said edge.

The invention also relates to an agricultural machine equipped with such an improved spraying device.

BRIEF DESCRIPTION OF THE DRAWINGS

The invention will be better understood by virtue of the description hereinafter, which relates to a preferred embodiment, provided by way of non-limitative example and explained with reference to the attached schematic drawings, wherein:

FIGS. 5A to 5C are perspective views of different alternative embodiments of the active and mobile organ in the form of deflector rotor comprising part of the device represented in FIGS. 1 to 4.

DETAILED DESCRIPTION

Figure 1:
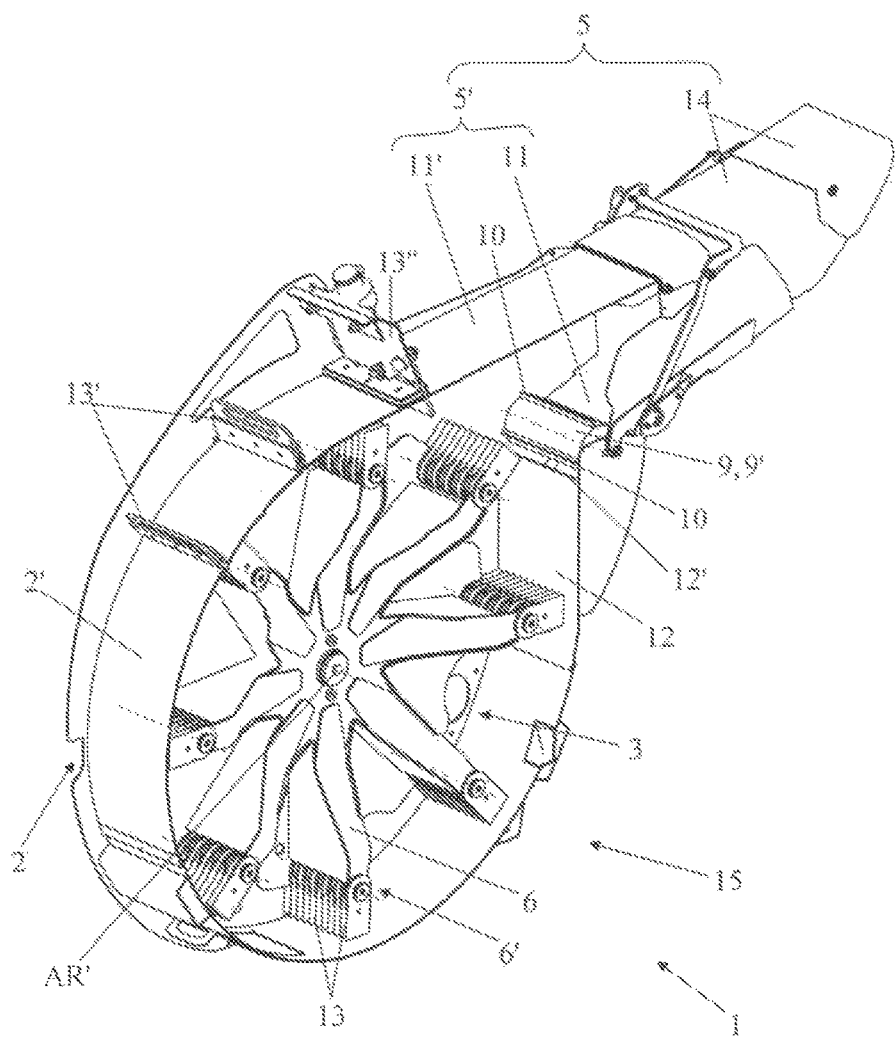
FIGS. 1 and 2 are perspective views in two different directions of an improved spraying device according to the invention, wherein the part of the casing comprising the product feed opening has been removed.

FIGS. 1 to 4 of the attached drawings illustrate a device 1 for spraying bulk or piecemeal products, in particular products for animal feed or the formation of bedding for animals. This device comprises a casing 2, in which a rotary spraying organ 3 is mounted. This casing 2 is provided with a lateral ejection opening 4 prolonged by a conduit or a spout 5. Rotary organ 3 has radial vanes 6 designed to impel the products in order to eject them through the opening into the spout, by forming a material jet substantially directed along the median axis AM of spout portion 5' adjacent to opening 4, and advantageously with simultaneous generation of a stream of carrier air (air stream generated by organ 3 and circulating in spout 5 toward the outside). Ejection opening 4 is made in peripheral wall 2' of casing 2 along the internal face of which outer ends 6' of radial vanes 6 travel, and it is provided with a rim or a bounding edge 8 disposed on that side of the opening which is last to be reached by outer peripheral ends 6' of vanes 6 in the course of their rotation during operational functioning of device 1, and which generally form the rim or the lower bounding edge of the said opening.

In conformity with the invention, at least one active and mobile organ 9, capable of and designed for directing the products that come into contact with it through opening 4, into spout 5 and substantially into jet 7 of ejected materials, is disposed in the region of the said rim or of the said edge 8.

Thus organ 9, because of its positioning and its nature (active and mobile) prevents the accumulation of products at the level of the rim and of the edge 8.

In addition, because of its specific action, it achieves spraying of the products that come into contact with it by redirecting them toward the upper part of passage 5" formed by spout 5 where the main air stream (main component of the carrier air stream) and most of the material jet 7 are circulating. Thus organ 9 forms, in the region of lower rim 8 of the entry of spout 5, an active rebound or deflection surface, imparting additional kinetic energy to the products that come into contact with it, with modification of their direction of displacement.

Nevertheless, no additional function of cutting up and/or chopping of the products by the said organ 9 is sought (it would be ineffective a priori in this zone), even though supplementary disaggregation of the said products under the effect of their collision with mobile organ 9 cannot be ruled out, which would depend in particular on the nature of the products in question as well as on the practical embodiment of the said organ 9.

Nevertheless, in agreement with a preferred embodiment, and as shown in FIGS. 1 to 4, organ 9 consists advantageously of a rotary organ, preferably of substantially cylindrical shape, with an axis of rotation AR disposed transversely relative to the direction of ejected material jet 7, preferably parallel to the axis of rotation AR' of rotary spraying organ 3, and provided on its outer face designed to come into contact with the products with protruding structures or projections 10, especially of the profiled type, such as, for example, fins or vanes, which may or may not extend parallel to the axis of rotation AR of the said active organ 9.

Rotary organ 9 may be mounted to rotate freely, wherein its drive can then result from the air stream, generated by rotary spraying organ 3 and channeled into spout 5, which strikes at least protruding structures 10.

Nevertheless, in agreement with a preferred embodiment, active and mobile organ 9 is driven positively in rotation, preferably with a peripheral linear velocity lower than or equal to half of the peripheral linear velocity of rotary spraying organ 3. In addition, it advantageously consists of a rotor with a body 9' having a cylindrical wall provided with fins or protruding vanes 10 on its outer face, arranged parallel to its axis of rotation AR.

Thus organ 9 has a structure that is closed to the outside, by this fact preventing the ingress and retention of products in body 9', while being provided with means 10 for effectively driving the said products, to relaunch them toward the main stream.

Figure 2:
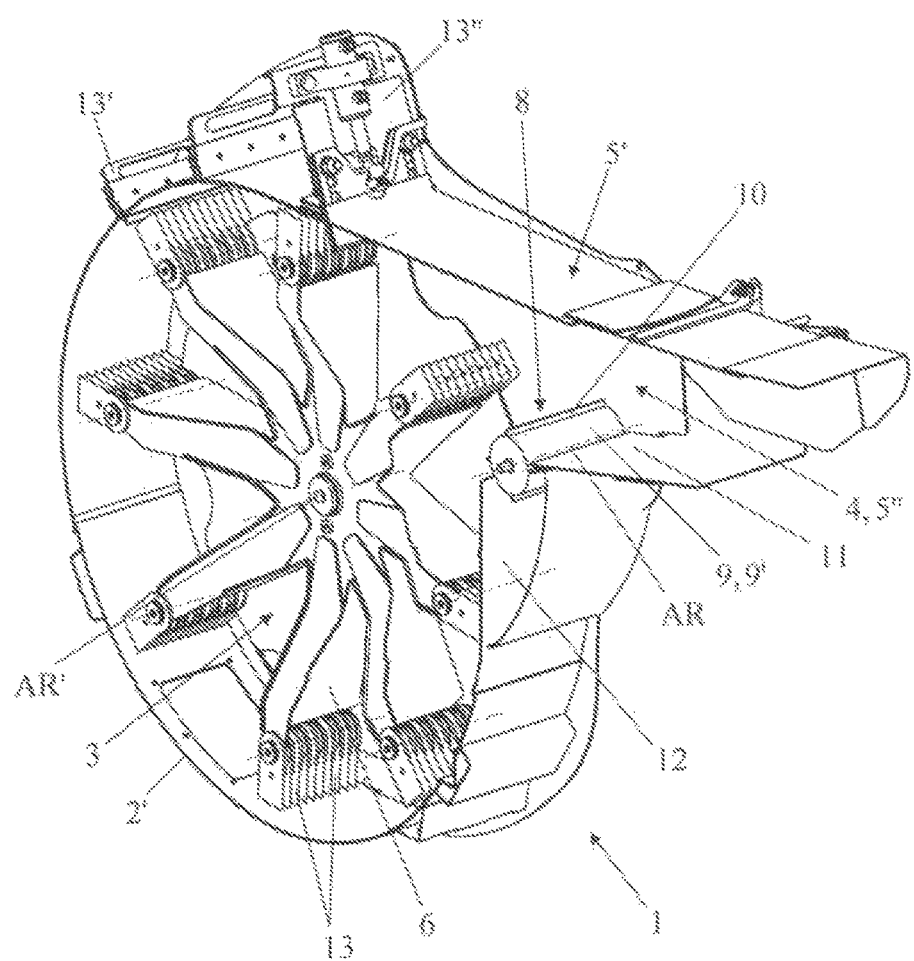
Figure 3:
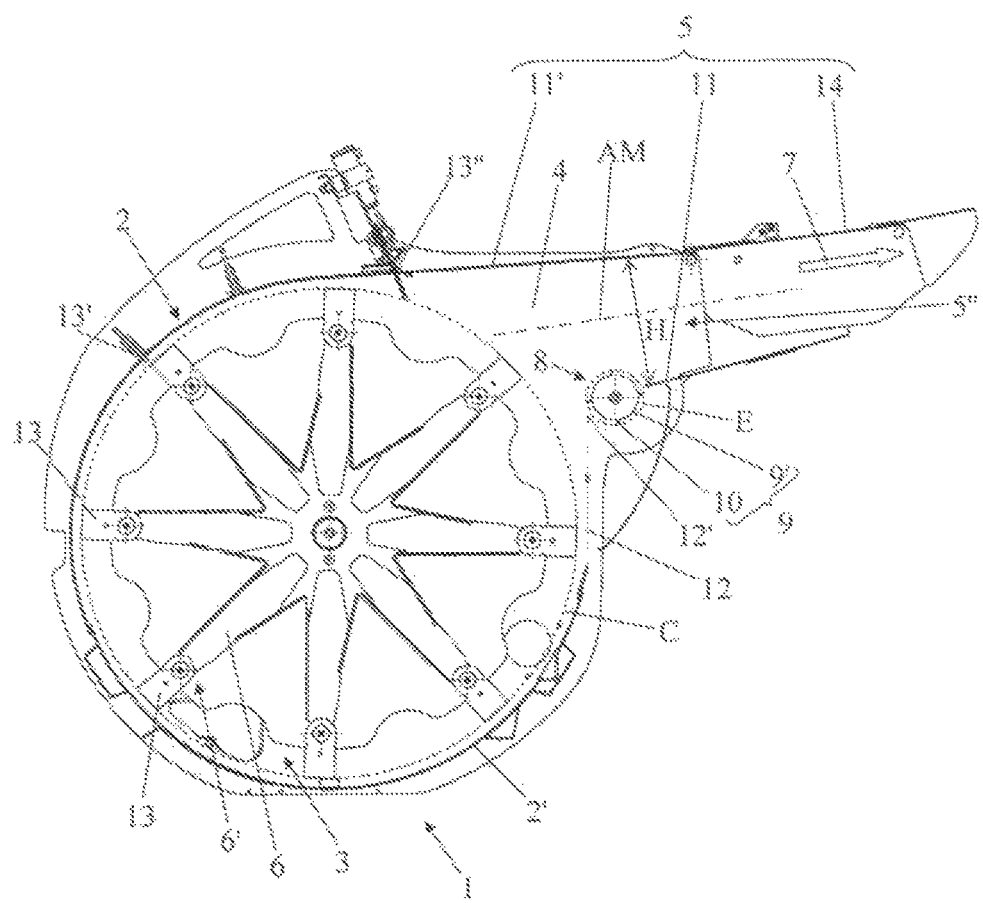
FIG. 3 is a view in front elevation, in a direction parallel to the axis of rotation of the rotary ejection organ, of the spraying device of FIGS. 1 and 2.
Figure 4:
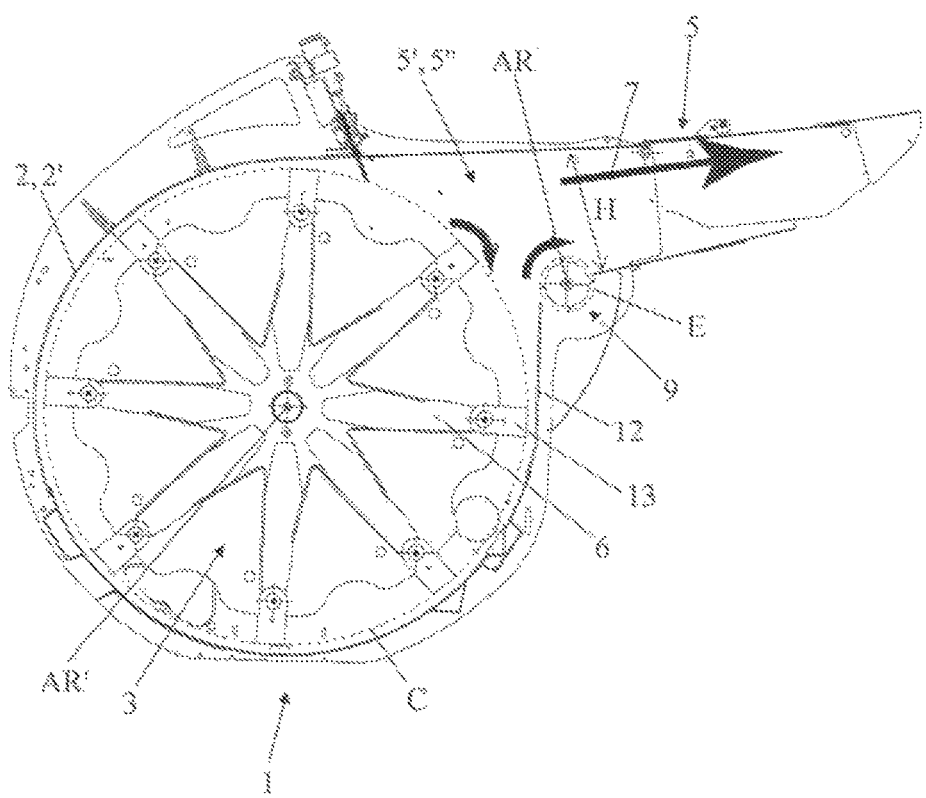
FIG. 4 is a view similar to that of FIG. 3, illustrating the device in operation with the different product streams.

Although FIGS. 1 to 3 illustrate, in a preferred embodiment, a deflector rotor 9 with a cylindrical body 9' of axial extent and circular section provided with four straight fins 10, other constructive variants can be envisioned, such as, by way of examples:

- two profiled L-section plates, assembled together by welding to form a body 9' with cylindrical wall of square, rectangular or rhombic section, with two fins 10, which are protruding and parallel to the axis of rotation AR, formed by the ends of the long legs of the L-shaped profiles (see FIG. 5A);
- a body 9' with cylindrical wall provided on its outer face with a lining with a large coefficient of adhesion, a plurality of spaced-apart barbs 10 or analogous protuberant structures (see FIG. 5B);
- a body 9' with cylindrical wall provided on its outer face with fins 10 in the form of spirals or chevrons (for example as wales mounted on the said outer face) that concentrate, toward the center of the outlet stream, the ejected product coming into contact with rotor 9.

A cleaning means, for example of the scraper type, may be associated with rotor 9 as the case may be to prevent accumulations of product on its outer face.

The active drive of the said organ 9 may be achieved by the agency of a specific actuator (hydraulic, electric or other motor) or preferably by a motion transmitting means that also drives rotary spraying organ 3, connected to an actuator integrated in or external to machine 16 incorporating device 1.

For optimized functioning efficiency and in order to cover the neutral zone as well as possible, the active and mobile organ 9 extends substantially over the entire width of lateral ejection opening 4 and partly into passage 5" defined by spout portion 5' adjacent to the aforesaid opening 4, advantageously with a degree of protrusion, relative to lower wall 11 of spout portion 5', at most equal to one third of the height of the said passage 5", preferably with a protrusion between one fifth and one third of this height.

This specific arrangement of organ 9 makes it possible in particular to facilitate the integration of products deflected by it into the main ejection stream, without appreciably obstructing the passage into spout 5.

In agreement with a preferred embodiment of the invention, illustrated in the attached figures, active and mobile organ 9 of cylindrical shape itself constitutes the rim or lower edge 8 of lateral ejection opening 4, as well as, at least partly, the said lower wall 11 of spout portion 5' adjacent to the said lateral ejection opening 4, wherein the external peripheral space occupied by the said organ 9 (illustrated in FIG. 3 by the virtual circle E traveled by the outer edges of fins 10) is advantageously flush with the inside face of peripheral wall 2' of casing 2 extending radially around rotary spraying organ 3 and in which lateral ejection opening 4 is made.

To obtain an optimum active deflection effect by organ 9, as a function in particular of the type of ejected product, it may be provided that the said organ 9 protrudes into passage 5" defined by spout portion 5' adjacent to lateral ejection opening 4, preferably via the bottom, while being mounted adjustably in height relative to corresponding lower wall 11 of spout 5, preferably of square or rectangular section, advantageously by adjustable positioning with releasable clamping of axis of rotation AR of rotor-forming organ 9.

In this way optimum segregation is obtained between the products scheduled to be ejected and those scheduled to remain in casing 2 for a longer time.

For the types of machines and products concerned in the present application, the inventors have been able to find through tests that a minimum linear velocity of approximately 7 m/s of organ 9 (at the level of virtual circle E) would permit optimized functioning of the invention.

According to one practical alternative embodiment, it may be provided that upper wall 11' of spout portion 5' adjacent to lateral ejection opening 4 extends, viewed in a direction parallel to axis of rotation AR' of rotary ejection organ 3, continuously from peripheral wall 2' of casing 2 arranged radially around the said rotary spraying organ 3, in a direction substantially tangential to exterior peripheral circle C swept by the ends of radial vanes 6 in the course of their rotation. In addition, the said peripheral wall 2' ends advantageously in a recycling plate 12, the free end portion 12' of which is prolonged to lower rim 8 of lateral ejection opening 4 receiving or formed by active and mobile organ 9, in a manner deviating from the exterior peripheral circle swept by the said ends 6' of radial vanes 6.

Free portion 12' may if necessary be provided with the scraper mentioned in the foregoing. Such a cleaning organ may, depending on the case, also be provided at the level of the rim of wall 11 adjacent to active organ 9.

When rotary organ 3 must also fulfill a function of size reduction of the products in addition to the spraying function, it may be provided that ends 6' of radial vanes 6 are equipped with cutters 13, mounted pivotally on the said vanes 6, advantageously over the entire width of peripheral wall 2' of casing 2, and that the said casing 2 is equipped with counter-cutters 13', 13" mounted in fixed or adjustable relationship and with mutual spacing on the circumference of casing 2 at the level of the said peripheral wall 2' extending radially around rotary spraying organ 3, the said cutters 13 and counter-cutters 13', 13" cooperating mutually during the rotation of radial vanes 6 in order to cut up and/or chop the products to be ejected.

The person skilled in the art understands that, within the scope of practical realization, spraying device 1 according to the invention has a basic constitution and a mode of operation similar to those of the device described in the aforesaid document FR 2993138 and represented in FIG. 5 thereof.

In FIG. 3, the symbol C indicates the virtual circle traveled by the outer edges of cutters 13.

In addition, it may also be provided that the conduit or spout 5 is constituted by at least two consecutive portions 5' and 14 interconnected in articulated manner, in such a way as to permit at least limited adjustment of the direction of ejection of products at the outlet of the said spout or of the said conduit 5. These two portions may if necessary have a common lower wall 11 and portion 14 may itself have several articulated sections.

Finally, casing 2 is also provided with a feed opening 15 that makes it possible to convey products to be sprayed toward rotary spraying organ 3 of discoid structure, preferably in a direction substantially perpendicular to the plane of the said organ 3 and therefore substantially parallel to axis of rotation AR' of the said organ 3.

The invention also relates to, as is shown by way of example in FIG. 6, a fixed or mobile agricultural machine 16, especially an autonomous machine or a machine towed by or mounted on a tractor vehicle, the said machine 16 being fed during operation by bulk or piecemeal products that are to be sprayed for some distance in the form of a directional jet 7, if necessary after preliminary chopping or cutting up.

In conformity with the invention, this agricultural machine 16 is characterized in that it comprises a spraying device 1 such as described in the foregoing.

In addition, spraying device 1 may be fed with products from a container 17, such as a chamber or skip, which may or may not be integrated with the structure of the said machine 16, the products undergoing an operation of disaggregation, separation and/or untangling if necessary, by the agency of an adapted means 18, before their introduction into casing 2 containing rotary spraying organ 3.

Figure 6:
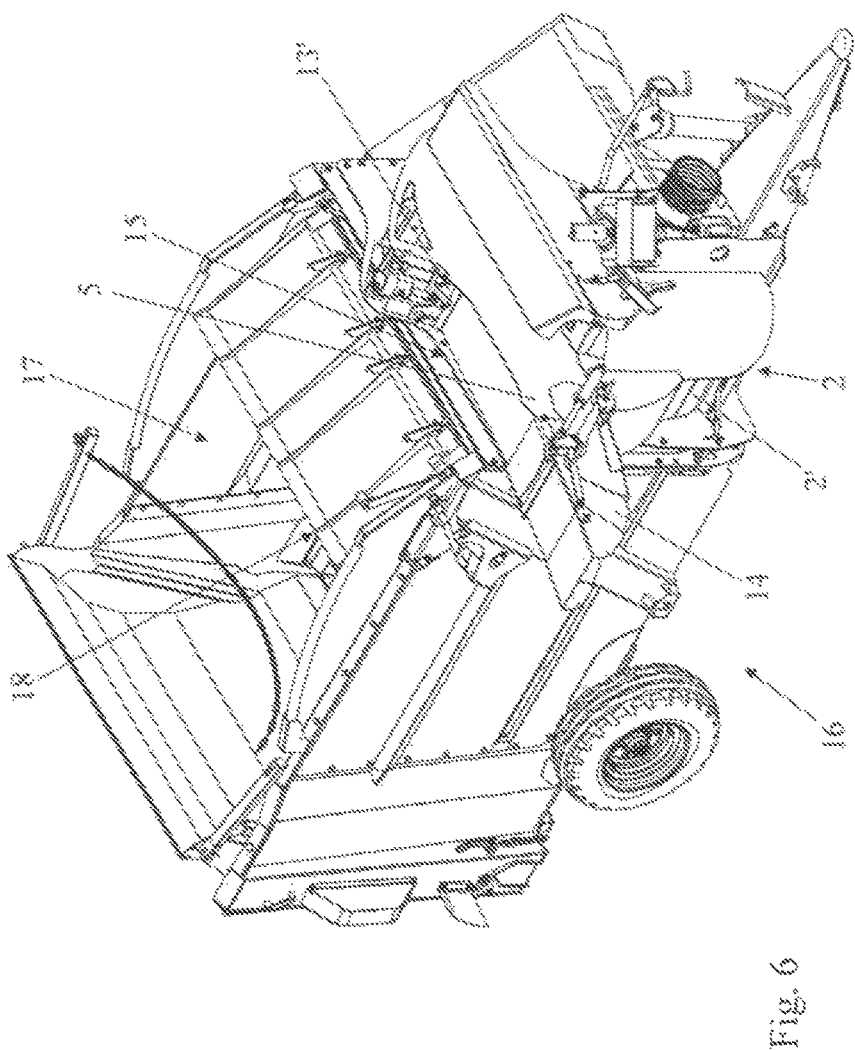
FIG. 6 is a perspective representation of a distributing shredder-chopper provided with a spraying device according to the invention.

In agreement with a preferred application of the invention, and as shown in FIG. 6, agricultural machine 16 consists of a mounted or towed distribution machine, the active organs 3, 9, 18 of which are advantageously driven by the power take-off of the tractor vehicle and which is capable of and designed for spraying products for animal feed or bedding, such as, for example a distributing shredder-chopper.

Of course, the invention is not limited to the embodiment described and represented in the attached drawings. Modifications remain possible, especially from the viewpoint of the constitution of the various elements or by substitution of equivalent techniques, without going beyond the scope of protection of the invention.

The invention claimed is:

1. A device for spraying bulk or piecemeal products, comprising:
    a casing in which a rotary spraying organ is mounted that is provided with a lateral ejection opening prolonged by a conduit or a spout, the rotary organ having radial vanes designed to impel the products in order to eject them through the opening into the spout, by forming a material jet directed substantially along a median axis of a portion of the spout adjacent to the opening, and with simultaneous generation of a carrier air stream,
    wherein the ejection opening is made in a peripheral wall of the casing, along an internal face of which outer ends of the radial vanes travel, and the casing is provided with a rim or bounding edge disposed on a side of the opening which is last to be reached by outer peripheral ends of the radial vanes in the course of rotation during operational functioning of the device, and which generally forms a lower rim or bounding edge of the opening,
    wherein the spout includes an upper wall and a lower wall, the upper wall extending in a tangential direction from an exterior peripheral circle swept by the outer ends of the radial vanes, and the lower wall being positioned directly below the upper wall,
    wherein at least one active and mobile organ is configured to direct the products that come into contact with the active and mobile organ through the opening and into a passage between the upper wall and the lower wall, into the spout and substantially into the jet of ejected material, the active and mobile organ being disposed within the lower wall of the spout in the region of the rim or of the edge, and
    wherein the peripheral wall ends in a recycling plate, and a free end portion of the recycling plate extends to the lower rim of the lateral ejection opening receiving or formed by the active and mobile organ such that the free end portion deviates from the exterior peripheral circle swept by the ends of the radial vanes.

2. The spraying device according to claim 1, wherein the active and mobile organ includes a rotary organ with an axis of rotation disposed transversely relative to the direction of the ejected material jet, the rotary organ of the active and mobile organ being configured to come into contact with the products with protruding structures or projections.

3. The spraying device according to claim 2, wherein the active and mobile organ is driven in rotation and includes a rotor with a body having a cylindrical wall provided with fins or protruding vanes on its outer face, arranged parallel to the axis of rotation.

4. The spraying device according to claim 2, wherein the active and mobile organ protrudes into the passage defined by the spout adjacent to the lateral ejection opening, while being mounted adjustably in height relative to the lower wall of the spout by adjustable positioning with releasable clamping of the axis of rotation.

5. The spraying device according to claim 1, wherein the active and mobile organ extends substantially over the entire width of the lateral ejection opening and partly into a portion of the passage between the upper wall and the lower wall of the spout that is adjacent to the opening, with a degree of protrusion, relative to the lower wall of the spout, at most equal to one third of a height of the passage between the upper wall and the lower wall.

6. The spraying device according to claim 1, wherein the active and mobile organ is of cylindrical shape and constitutes the rim or the lower edge of the lateral ejection opening, as well as, at least partly, the lower wall of the spout adjacent to the lateral ejection opening, wherein an external peripheral space occupied by the active and mobile organ is flush with an inside face of the peripheral wall of the casing extending radially around the rotary spraying organ and in which the lateral ejection opening is made.

7. The spraying device according to claim 1, wherein ends of the radial vanes are equipped with cutters mounted pivotally on the radial vanes over an entire width of the peripheral wall of the casing, and wherein the casing is equipped with counter-cutters mounted in fixed or adjustable relationship and with mutual spacing on a circumference of the casing at a level of the peripheral wall extending radially around the rotary spraying organ, the cutters and counter-cutters cooperating mutually during the rotation of the radial vanes in order to cut up and/or chop the products to be ejected.

8. The spraying device according to claim 1, wherein the conduit or the spout is constituted by at least two consecutive portions interconnected in articulated manner, in such a way as to permit at least limited adjustment of the direction of ejection of products at an outlet of the spout or of the conduit.

9. The spraying device according to claim 1, wherein the casing is provided with a feed opening to convey products to be sprayed toward the rotary spraying organ of discoid structure.

10. The spraying device according to claim 1, wherein the products are products for animal feed or formation of bedding for animals.

11. A fixed or mobile agricultural machine, the machine being fed during operation by bulk or piecemeal products that are to be sprayed for some distance in the form of a directional jet, the agricultural machine comprising:
    the spraying device according to claim 1.

12. The agricultural machine according to claim 11, wherein the spraying device is fed with products from a container, the products undergoing an operation of disaggregation, separation and/or untangling when necessary, before being introduced into the casing containing the rotary spraying organ.

13. The agricultural machine according to claim 11, wherein the spraying device is included in a mounted or towed distribution machine, the active organs of which are driven by the power take-off of the agricultural machine and which is configured to spray products for animal feed or bedding.

14. The agricultural machine according to claim 13, wherein the distribution machine is a distributing shredder-chopper.

15. The agricultural machine according to claim 11, wherein the agricultural machine is an autonomous machine or a machine towed by or mounted on a tractor vehicle.

16. The spraying device according to claim 1, wherein the active and mobile organ is formed by two L-shaped plates assembled together to form a body with two fins that protrude from the body, the fins being parallel to an axis of rotation of the active and mobile organ.

17. The spraying device according to claim 1, wherein the active and mobile organ is formed by a cylindrical body including fins on an outer face of the cylindrical body, the fins being shaped as spirals or chevrons.

18. A device for spraying bulk or piecemeal products, comprising:

a casing in which a rotary spraying organ is mounted that is provided with a lateral ejection opening prolonged by a conduit or a spout, the rotary organ having radial vanes designed to impel the products in order to eject them through the opening into the spout, by forming a material jet directed substantially along a median axis of a portion of the spout adjacent to the opening, and with simultaneous generation of a carrier air stream, wherein the ejection opening is made in a peripheral wall of the casing, along an internal face of which outer ends of the radial vanes travel, and the casing is provided with a rim or bounding edge disposed on a side of the opening which is last to be reached by outer peripheral ends of the radial vanes in the course of rotation during operational functioning of the device, and which generally forms a lower rim or bounding edge of the opening, wherein the spout includes an upper wall and a lower wall, the upper wall extending in a tangential direction from an exterior peripheral circle swept by the outer ends of the radial vanes, and the lower wall being positioned directly below the upper wall, wherein at least one active and mobile organ is configured to direct the products that come into contact with the active and mobile organ through the opening and into a passage between the upper wall and the lower wall, into the spout and substantially into the jet of ejected material, the active and mobile organ being disposed within the lower wall of the spout in the region of the rim or of the edge, and wherein ends of the radial vanes are equipped with cutters mounted pivotally on the radial vanes over an entire width of the peripheral wall of the casing, and wherein the casing is equipped with counter-cutters mounted in fixed or adjustable relationship and with mutual spacing on a circumference of the casing at a level of the peripheral wall extending radially around the rotary spraying organ, the cutters and counter-cutters cooperating mutually during the rotation of the radial vanes in order to cut up and/or chop the products to be ejected.

* * * * *